Figure 1:
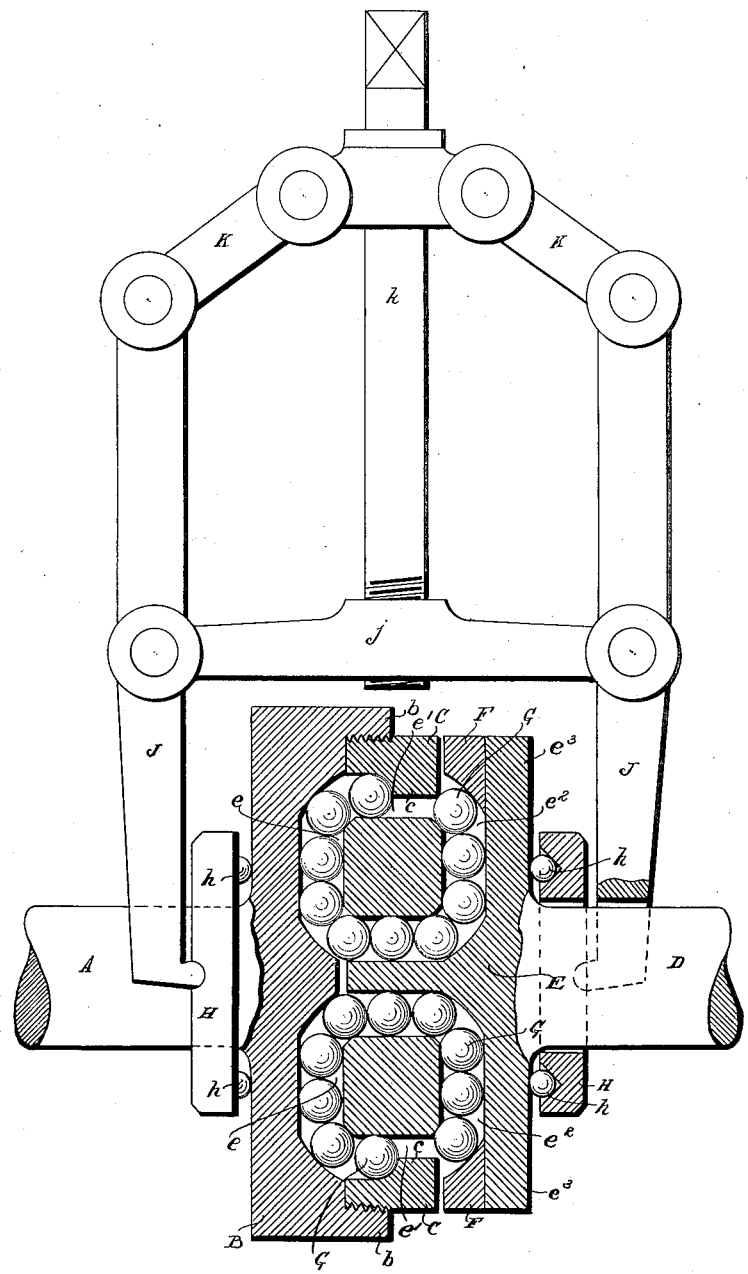

D. GEORGE.
VARIABLE SPEED TRANSMISSION CLUTCH.
APPLICATION FILED MAR. 8, 1909.

934,604.

Patented Sept. 21, 1909.
2 SHEETS—SHEET 1.

Witnesses
J. Spantikow
C. Heymann

Inventor
David George
per B. Singer
Attorney

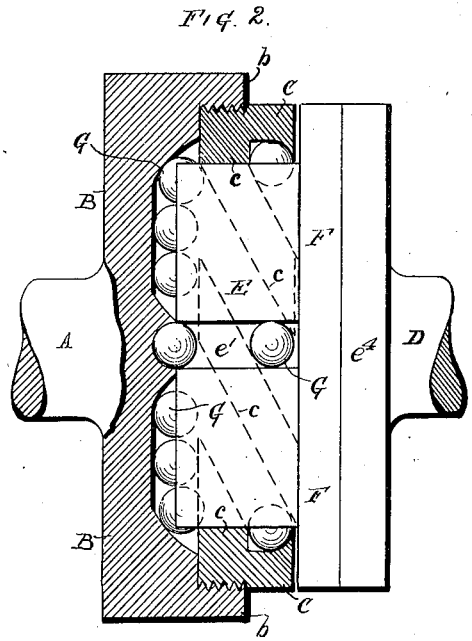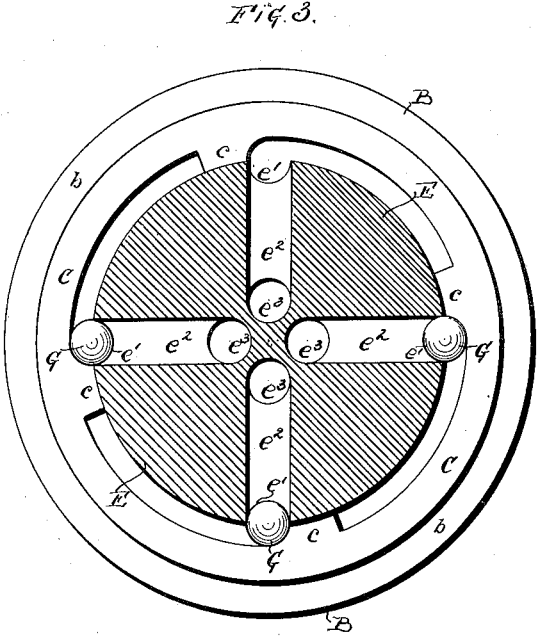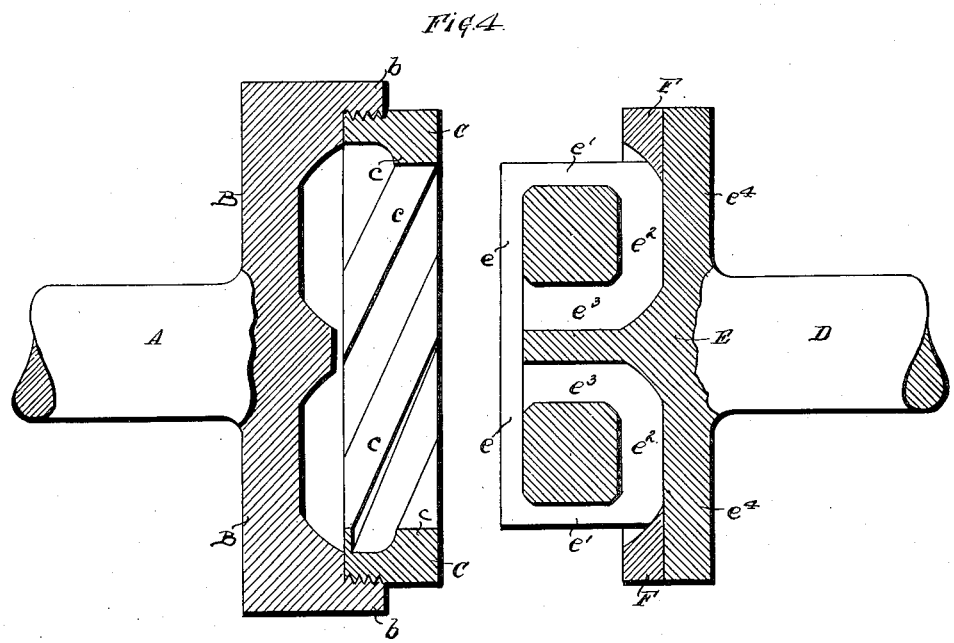

UNITED STATES PATENT OFFICE.

DAVID GEORGE, OF HARDWAY, GOSPORT, ENGLAND.

VARIABLE-SPEED TRANSMISSION-CLUTCH.

934,604.

Specification of Letters Patent.   Patented Sept. 21, 1909.

Application filed March 8, 1909. Serial No. 481,962.

*To all whom it may concern:*

Be it known that I, DAVID GEORGE, a subject of the King of Great Britain and Ireland, residing 3 Grove road south, Hardway, Gosport, in the county of Hants, England, have invented certain new and useful Improvements in Variable-Speed Transmission-Clutches, of which the following is a specification.

This invention relates to a variable speed transmission clutch based upon a screw and ball action, which permits a driven shaft to be turned at any reduced speed with regard to a driving shaft or to be locked to the driver and rotate at the same speed.

One element of the clutch consists of a number of sets of balls, each set moving in a channel formed in the head of the shaft, preferably the driven shaft, and in a plane parallel to the axis. The inner portion of the channel forms a complete passage, the outer portion consisting of a groove of about half the depth of the balls, and the balls are, when the clutch is inoperative, free to travel continuously around the channel receiving them.

The second element of the clutch consists of a strong ring screwed in the head of the driving shaft and having a series of coarse internal threads between which the outer faces of the balls project.

The two elements or members of the clutch are free to move axially so as to bind more or less tightly against each other and retard or stop the movement of the balls and this action is controlled by gripping levers operated preferably by a screw and toggle joint or other powerful method of control and acting through collars provided with ball bearings.

In order that my invention may be more readily understood, reference is had to the accompanying sheet of drawings in which:—

Figure 1 is a longitudinal section of the complete clutch showing the gripping device in elevation; Fig. 2 is a longitudinal section, partly in elevation, of the clutch members; Fig. 3 is a transverse section; and Fig. 4 is a longitudinal section showing the two main members separated.

On the driving shaft A is the disk head B having the flange $b$ which receives the ring C cut internally with the large spiral threads $c$ of coarse pitch and pointed or wedge shaped ends, each thread extending through only a fraction of a circle. On the driven shaft D is a head E of peculiar form. It projects at the end within the flange $c$ of the head B and is encircled by the screw ring C. The face of the head E is cut with a series of semicircular ball channels $e$ extending radially from the center to the circumference and continued along the outside by the longitudinal grooves $e^1$, a set of complete ball circuits being made by these grooves and the connecting radial and longitudinal passages $e^2$ and $e^3$. The head E has the ring F upon the face of the flange $e^4$ to inclose and assist in guiding the balls G within the channels.

Each complete channel or race $e$—$e^3$ receives a set of the balls G, which travel continuously along their channel when the clutch members are not bound together. The circulation of the balls is effected by the screw threads $c$, which as shown especially in Fig. 2 (where the position of the threads is indicated in dotted lines) engage between two balls in a set and on relative rotation taking place the screw movement drives each set of balls around its channel or race.

To press the two members of the clutch together with any desired degree of force an arrangement such as is shown in Fig. 1 is employed.

Pressing rings H bear through balls $h$ on the backs of the disks or heads B and E and with these rings engage the ends of levers J mounted on a supporting bar $j$ and operated by the toggle arm K on the screw rod $k$ turning in the bar $j$ by means of a key or handle. The toggle arrangement enables the pressure to be adjusted easily and with considerable accuracy.

The general operation of the clutch is as follows:—When the members are not pressed together the balls G are free to roll in their races $e$—$e^3$ and the effect of turning the driving shaft A and consequently the coarse pitched screw $c$ is to cause each set of balls to roll around the circuit, owing to the screw thread which lies between the two end balls of each set. The head B of the driving shaft is recessed to receive the projecting balls and as one thread $c$ passes a set the next thread enters and continues the rolling action. Any pressure however which is applied by the gripping device causes the shaft head B to bind on the balls and resist their rotation. This resistance causes a reaction on the driven shaft D, which is turned with greater relative speed as the pressure on the balls increases and the slip decreases. When the pressure is sufficient the rolling action of the balls is completely prevented and the two shafts are locked together. The clutch therefore allows of a continuous variation of speed between the two shafts.

The details of construction of the clutch members may of course be varied without altering the essential features. For example I may avoid the formation of the passages $e^2$ in the solid head E by cutting grooves at the back and fitting on the shaft D a separate ring or flange to serve in place of the flange $e^4$ and ring F.

What I claim as my invention and desire to secure by Letters Patent is:—

1. In a variable speed transmission clutch or gear comprising a driving and a driven member, continuous ball races in one member, balls circulating in the said races, coarse pitched threads on the second member, engaging between the balls and driving them in their races, and means for applying variable pressure to retard or stop the circulation of the balls.

2. In a variable speed transmission clutch comprising a driving and a driven member, a plurality of continuous ball races in one member, each formed by a radial face groove, a radial passage at the back and a connecting longitudinal passage and an external groove, balls in the said races, screw threads on the second member and pressure applying mechanism for the members.

3. In a variable speed transmission clutch comprising a driving and a driven member, ball races and balls in one member, screw threads on the other member, gripping toggle levers pressing the members together and means for adjusting the pressure of the levers.

4. In a variable speed transmission clutch comprising a driving and a driven member, ball races and balls in one member, screw threads on the other member, gripping toggle levers pressing the members together, a frame carrying the said levers, and a screw adjustment for the levers.

5. In a variable speed transmission clutch comprising driving and driven shafts, a flange on the end of one shaft, balls and ball races in the body of the said flange, a flange on the second shaft recessed to receive the face of the first flange and the projecting balls and ball races, and an overhanging ring in the face of the second flange, having coarse internal screw threads engaging between the balls at the outer sides of their races, substantially as herein described.

In witness whereof I have hereunto set my hand in the presence of two witnesses.

DAVID GEORGE.

Witnesses:
NELLIE GEORGE,
A. J. WHETTEN.